(12) United States Patent
Parthibhan et al.

(10) Patent No.: US 9,194,418 B2
(45) Date of Patent: Nov. 24, 2015

(54) CONE NUT

(71) Applicant: Thomas & Betts International LLC, Wilmington, DE (US)

(72) Inventors: Suresh Kumar Parthibhan, Tamil Nadu (IN); Christine S. Reagan, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 14/183,716

(22) Filed: Feb. 19, 2014

(65) Prior Publication Data

US 2015/0233410 A1 Aug. 20, 2015

(51) Int. Cl.
*F16B 37/04* (2006.01)

(52) U.S. Cl.
CPC .................... *F16B 37/046* (2013.01)

(58) Field of Classification Search
CPC ..... F16B 37/044; F16B 37/045; F16B 37/046
USPC ...................... 411/84, 85, 104, 112
See application file for complete search history.

(56) References Cited

U.S. PATENT DOCUMENTS

| 3,114,404 | A | * | 12/1963 | Fiddler | ........................... 411/15 |
| 3,483,910 | A | | 12/1969 | La Londe et al. | |
| 3,493,025 | A | | 2/1970 | La Londe et al. | |
| 4,146,074 | A | * | 3/1979 | Kowalski | ...................... 411/111 |
| 4,486,133 | A | | 12/1984 | Pletcher | |
| 4,645,393 | A | | 2/1987 | Pletcher | |
| 5,209,619 | A | | 5/1993 | Rinderer | |
| 5,271,586 | A | | 12/1993 | Schmidt | |
| 5,375,798 | A | | 12/1994 | Hungerford, Jr. | |
| 5,411,356 | A | | 5/1995 | Travis et al. | |
| 5,489,173 | A | | 2/1996 | Hofle | |
| 5,503,511 | A | | 4/1996 | Flamme | |
| 5,624,217 | A | | 4/1997 | Hungerford, Jr. | |
| 5,628,598 | A | | 5/1997 | Hofle | |
| 5,820,322 | A | | 10/1998 | Hermann et al. | |
| 6,386,809 | B2 | | 5/2002 | Ikuta | |
| 6,582,170 | B2 | | 6/2003 | Dinh et al. | |
| 6,872,038 | B2 | | 3/2005 | Westlake | |
| 7,326,017 | B2 | | 2/2008 | Winker | |
| 7,905,694 | B2 | * | 3/2011 | van Walraven | ................. 411/85 |
| 2002/0071735 | A1 | | 6/2002 | Dinh et al. | |
| 2003/0185643 | A1 | * | 10/2003 | Thompson | ...................... 411/85 |
| 2008/0193253 | A1 | * | 8/2008 | van Walraven | ............... 411/111 |

FOREIGN PATENT DOCUMENTS

IN 251822 2/2013

* cited by examiner

*Primary Examiner* — Flemming Saether
(74) *Attorney, Agent, or Firm* — Hoffmann & Baron, LLP (57) ABSTRACT

An improved cone nut for a structural channel is provided. The cone nut does not require gluing of the cone to the channel nut as in conventional methods. The cone instead houses the channel nut by a friction fit locking mechanism, resulting in a secure attachment of the cone to the channel nut which prevents failure of the cone by separation from the channel nut which would, in turn, render the channel nut useless.

17 Claims, 7 Drawing Sheets

CONE NUT

FIELD OF THE INVENTION

In general, the present invention relates to an improved cone nut for a structural channel which does not use conventional gluing techniques and which has an improved design to eliminate cone failure in order to keep the nut securely fastened within the channel.

BACKGROUND

Elongate structural members have long been used for various purposes in the construction industry. These structural members, which are commonly referred to as struts, include an elongate channel having a generally U-shaped configuration. The lower edges of the U-shaped channel include inwardly turned flanges or shoulders extending along the length thereof. These inwardly turned shoulders support fastening hardware which allows for the attachment of various loads which may be supported by the struts.

In order to permit attachment of loads to the strut, a threaded fastener or nut is positioned within the channel of the strut and secured thereto. Channel nuts of this type are shown, for example, in U.S. Pat. Nos. 3,493,025, 4,645,393 and 4,486,133. These channel nuts include a nut portion typically formed of metal having a generally rectangular configuration so that it may be inserted into the strut channel longitudinally beneath the inwardly turned flanges or shoulders. Thereafter, the nut portion is rotated approximately 90° to a transverse position so that it will engage the undersurface of the flanges.

In order to locate and retain the nut portion within the channel, conventional channel nuts include an attached flexible cone typically formed of rigid plastic extending upwardly there from. The cone is snap fitted onto the nut portion, usually attached with glue, and due to the flexibility, resiliency and the particular shape forming the cone, the nut portion is continuously urged into engagement with the underside of the inwardly turned flanges of the channel.

During installation and use, it is possible that the cone can become detached from the nut portion, rendering the channel nut useless. Detachment of the cone from the nut portion can also result from failed glue strength in instances where the cone has been glued to the channel nut. Attempts to form the cone out of harder material results in superior attachment of the cone to the channel nut, but renders installation of the channel nut more difficult as more manual force is needed. Again, if the cone has been glued to the nut portion, the required extra manual force needed to effect installation of the channel nut can result in failure of the glue strength which holds the cone to the nut.

It is desirable to provide an improved channel nut having a cone which permits easy installation, yet remains captively attached to the channel nut portion.

SUMMARY OF THE INVENTION

The present invention provides an improved cone nut for a structural channel which uses a friction fit locking mechanism to attach a cone to a channel nut, eliminating the need for gluing the cone to the channel nut. This friction fit of the cone to the channel nut results in a cone nut which is not susceptible to failure of the cone due to insufficient strength of glue. The invention also provides time savings and ease of installation because a tedious gluing process of the cone to the nut is not required, as in conventional methods. Additionally, installer error resulting from the amount of glue used as related to conventional gluing techniques is also eliminated. The present invention of the cone nut provides a cone which houses the nut, resulting in an arrangement where the cone remains securely attached to the channel nut and which eliminates failure of the cone which would render the channel nut useless.

DETAILED DESCRIPTION OF THE PREFERRED EMBODIMENT(S)

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 1:
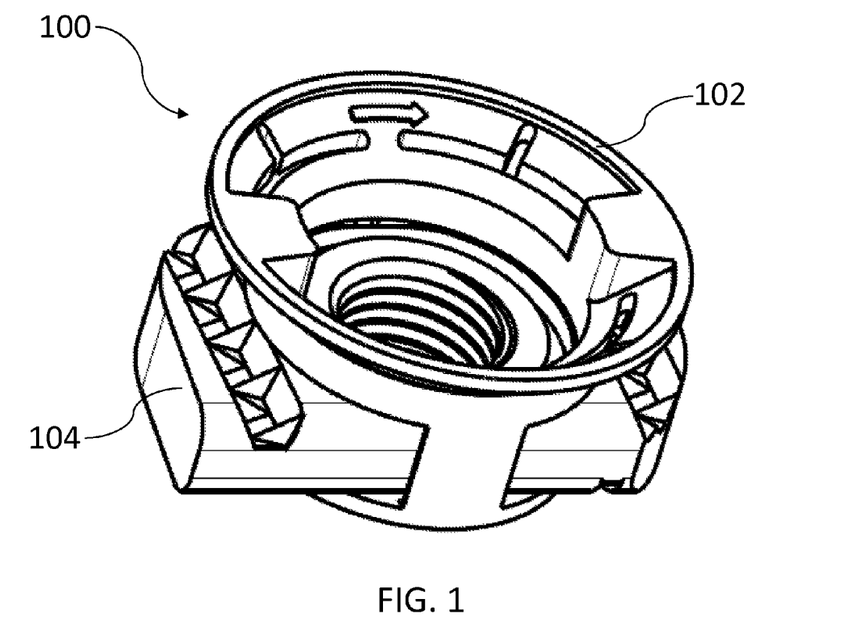
FIG. 1 is a front perspective view of a cone nut of the present invention.
Figure 2:
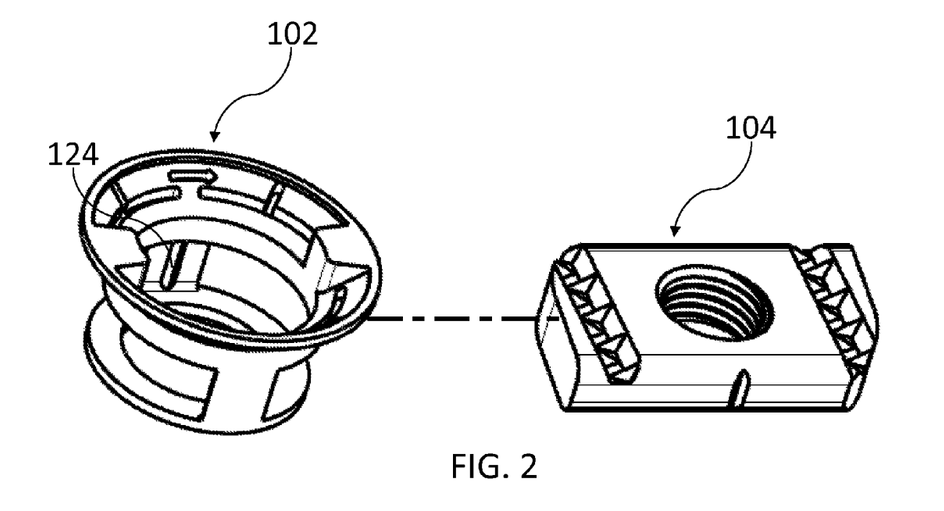
FIG. 2 is a front perspective exploded view of a cone nut of the present invention.
Figure 3:
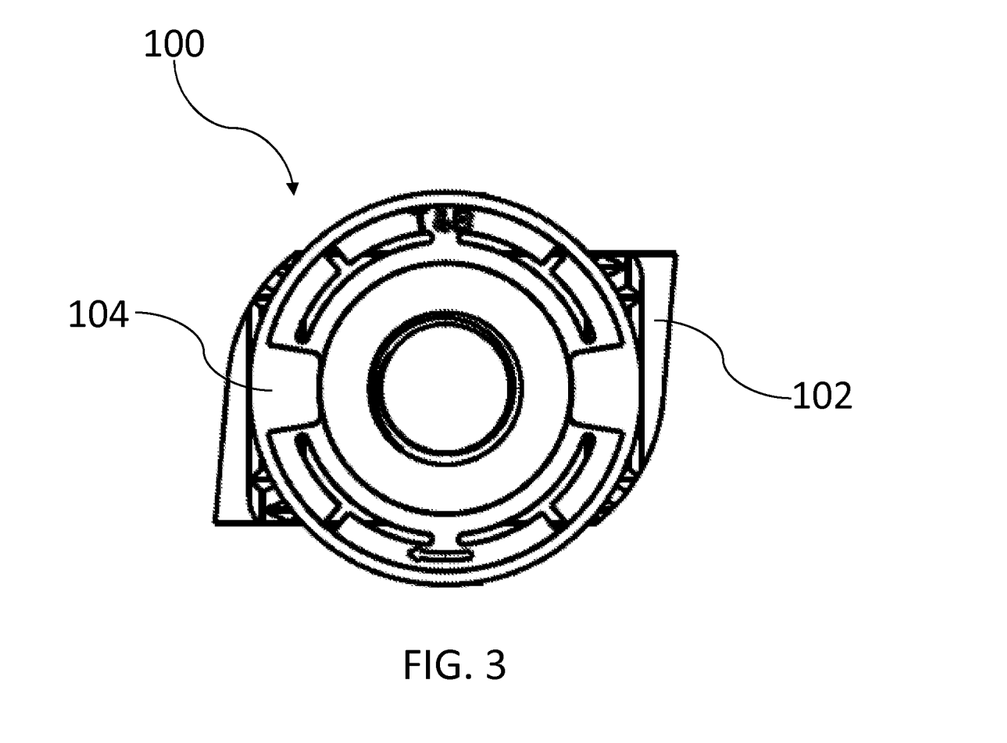
FIG. 3 is a top plan view of a cone nut of the present invention.

Shown in FIG. 1 is a front perspective view of a cone nut 100 of the present invention. The cone nut 100 is comprised of a flexible cone 102 and a channel nut 104. It is preferable that the flexible cone 102 is made of nylon and the channel nut 104 is made of metal, but it is understood that other materials may be chosen. FIG. 2 shows that the cone nut 100 is fully assembled when the cone 102 receives the channel nut 104. The channel nut 104 is received through a cone attachment portion 108 of the cone 102, as shown in FIG. 4.

Figure 4:
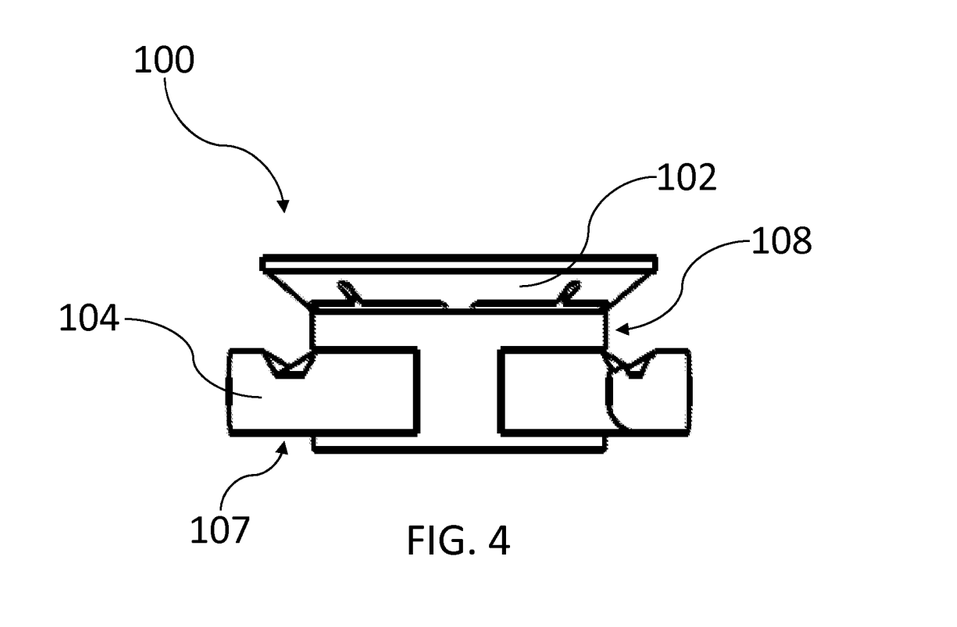
FIG. 4 is a side elevation view of a cone nut of the present invention.
Figure 5:
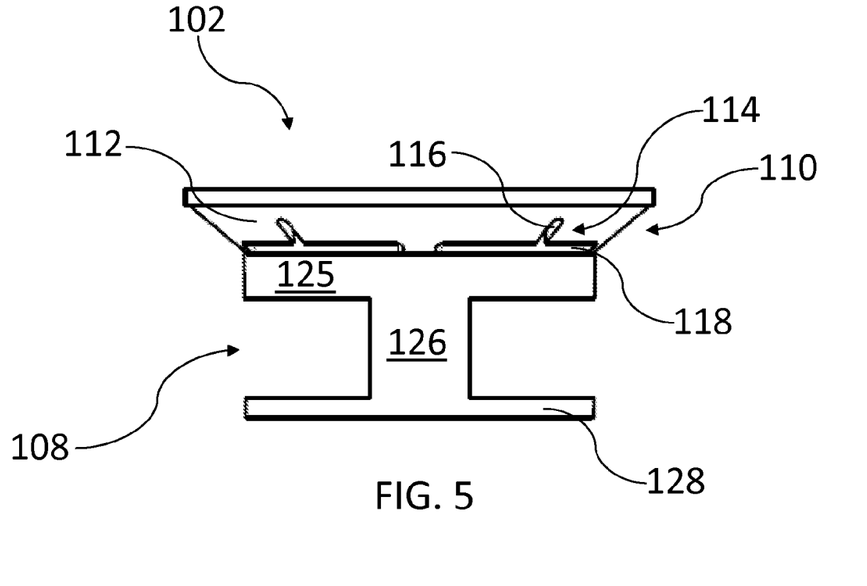
FIG. 5 is a side elevation view of the cone of a cone nut of the present invention.

The cone attachment portion 108 surrounds the channel nut 104 on four sides: a planar surface 106 (shown in FIG. 8A), two side surfaces 120 (shown in FIG. 8A) and a planar bottom surface 107 (shown in FIG. 4). A cone attachment bottom portion 128 abuts the planar bottom surface 107 of the channel nut 104, two cone attachment side portions 126 abut the two side surfaces 120 of the channel nut 104 and a cone attachment top portion 125 abuts the planar surface 106 of the channel nut 104, the various cone attachment portions being shown in FIGS. 5 and 6. With the various portions of the cone attachment portion 108 abutting the various surfaces of the channel nut 104, the cone attachment portion 108 securely encases the channel nut 104, as is illustrated in FIGS. 1, 3, 4, 10 and 11.

Figure 6:
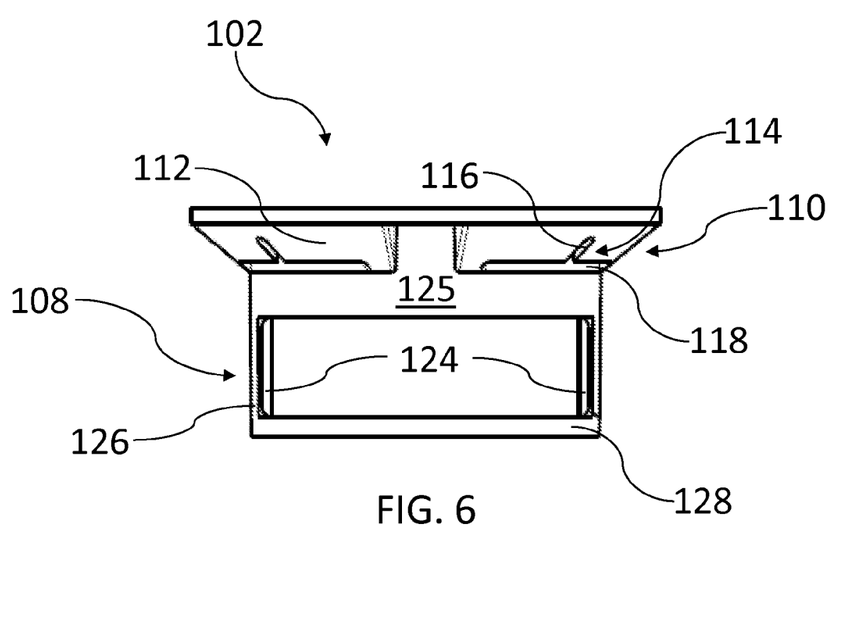
FIG. 6 is a front elevation view of the cone of a cone nut of the present invention.
Figure 8A:
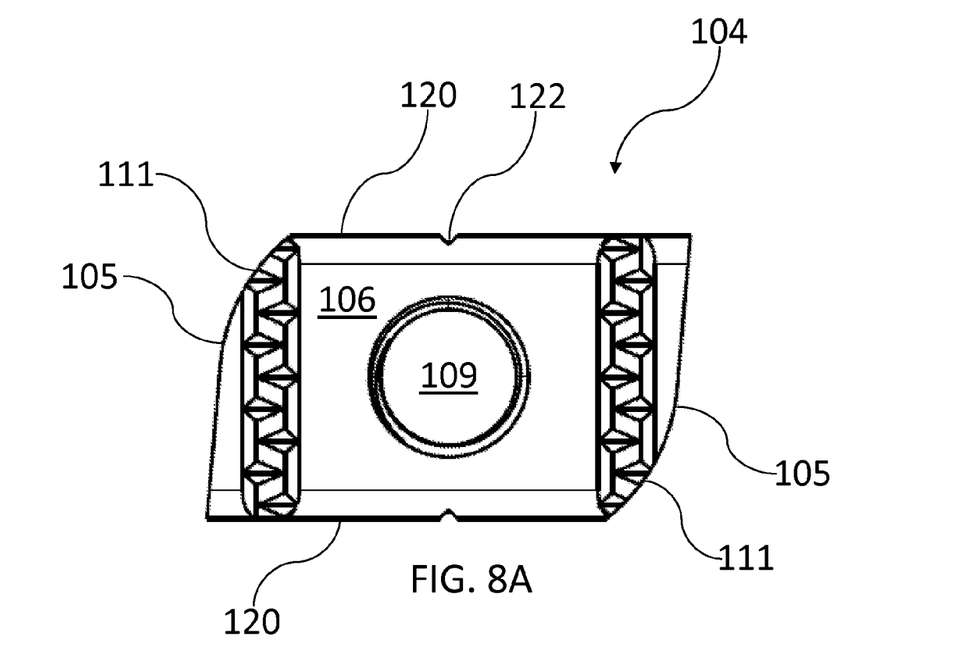
FIG. 8A is a top plan view of the channel nut of a cone nut of the present invention.
Figure 8B:
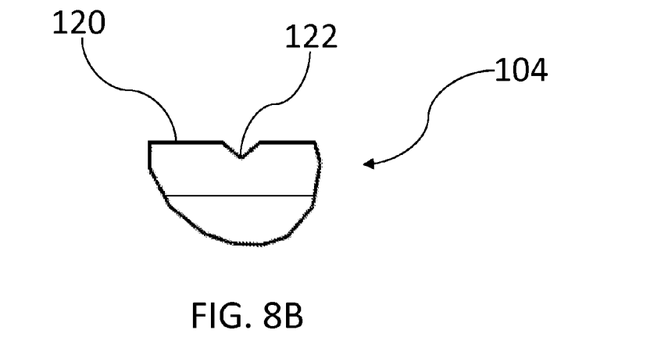
FIG. 8B is a top plan view of a groove of the channel nut of a cone nut of the present invention.

In order to keep the channel nut 104 securely attached to the flexible cone 102, the cone attachment portion 108 is comprised of a rib 124 which is located facing inward on at least one of the cone attachment side portions 126, as shown in FIG. 6. Though there are two ribs 124 that are shown in FIG. 6 which each are located facing inward on the two cone attachment side portions 126, it is understood that there may be fewer or more ribs 124. The rib 124 becomes seated within a corresponding groove 122 of the channel nut 104, which is shown in FIG. 8A. The groove 122 is located on the channel nut side surface 120. Though there is one groove 122 shown on each side surface 120 of the channel nut 104 in FIG. 8A, it is understood that there may be fewer or more grooves 122, so long as they correspond to the number of ribs 124 which the cone attachment portion 108 contains. A close-up view of the groove 122 of the channel nut 104 is shown in FIG. 8B. The interlocking of the ribs 124 of cone attachment portion 108 with the grooves 122 of the channel nut 104 provides a friction fit engagement between the cone 102 and the channel nut 104.

Figure 10:
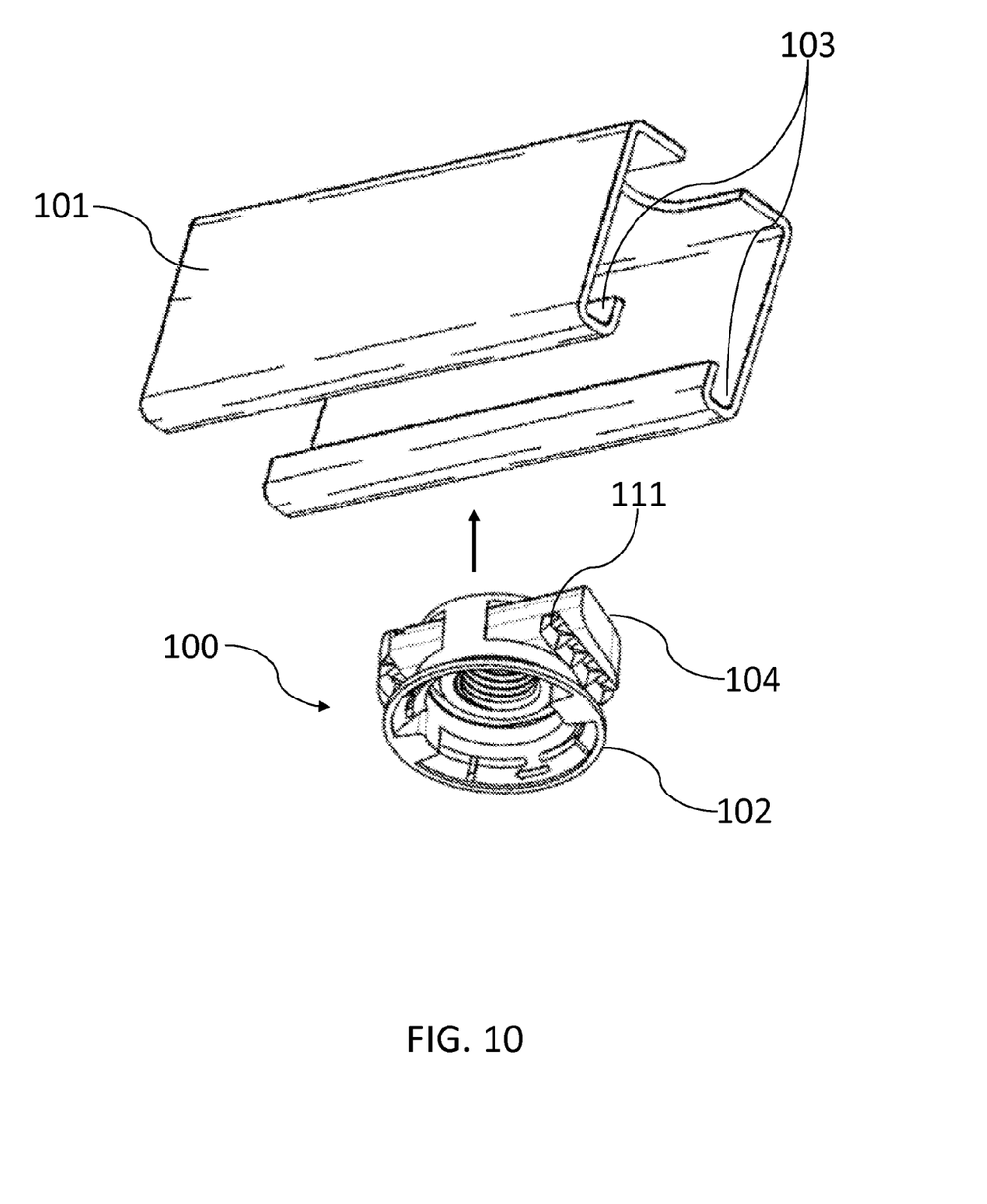
FIG. 10 is a bottom perspective view of a cone nut of the present invention being mounted onto a piece of structural channel.
Figure 11:
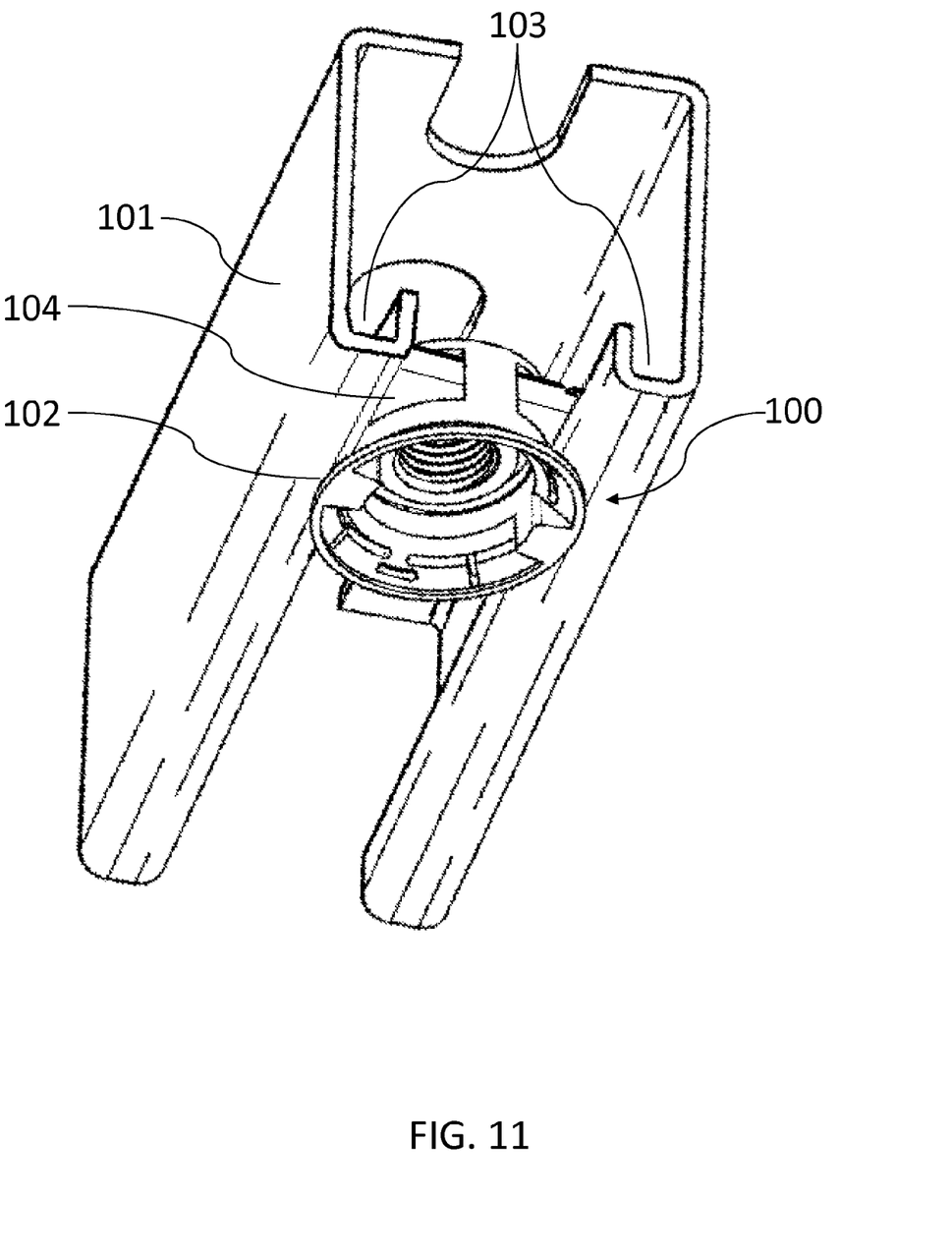
FIG. 11 is a bottom perspective view of a cone nut of the present invention having been mounted and secured onto a piece of structural channel.

Shown in FIGS. 10 and 11 are illustrations of the assembled cone nut 100, comprised of the flexible cone 102 and the channel nut 104, being installed onto a portion of structural U-shaped channel 101. The open side of the channel 101 is comprised of two inward turned flanges 103. The cone nut 100 is installed onto the structural channel 101 by inserting the channel nut 104 of the cone nut 100 into the structural channel 101 longitudinally beneath the inward turned flanges 103. Thereafter, the channel nut 104 is rotated approximately 90° so that it is in a transverse position in relation to the structural channel 101, thereby engaging the undersurface of the inward turned flanges 103. Cone 102 is therefore sized such that the channel nut 104 securely fits within the cone attachment portion 108 of cone 102, such that cone attachment portion 108 surrounds the channel nut 104, at least partially, on four sides of the channel nut 104, as previously explained.

Figure 9:
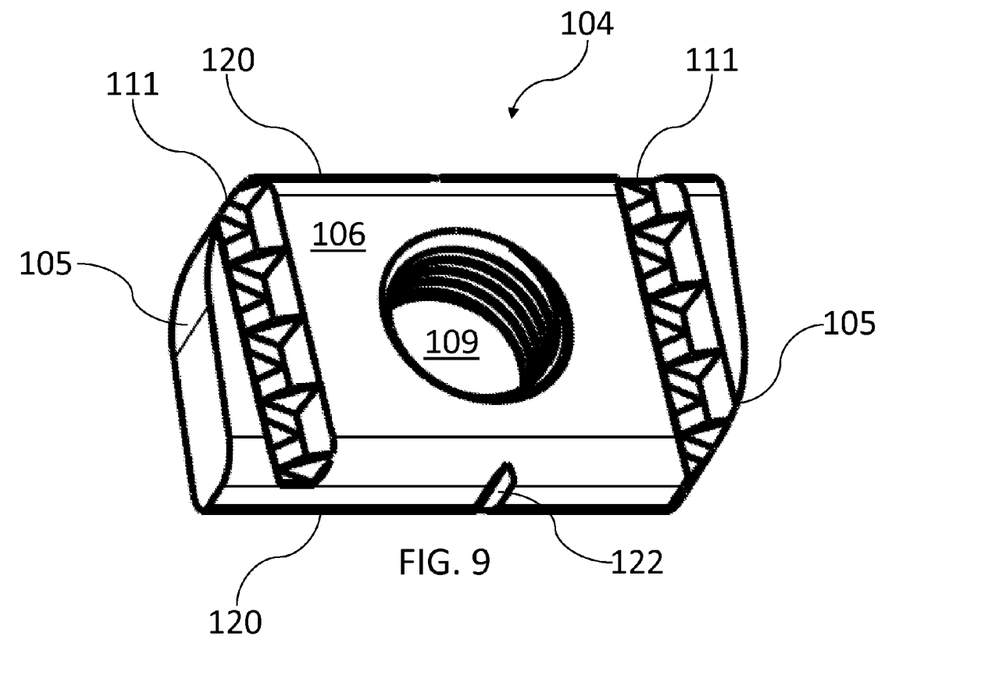
FIG. 9 is a top perspective view of the channel nut of a cone nut of the present invention.

In order to securely engage the channel nut 104 of the cone nut 100 with the flanges 103 of the structural channel 101, the channel nut 104 is comprised of slots 111 which are located on opposing ends of the channel nut 104 and shown in FIGS. 9 and 10. When the channel nut 104 is rotated approximately 90° as described above, the slots 111 engage with the inward turned flanges to securely position the channel nut 104 of the cone nut 100 within the structural channel 101. It can also be seen in FIG. 9 that the channel nut 104 is comprised of curved edges 105 which are located on opposing ends of the channel nut 104, similar to the slots 111 mentioned above. These curved edges 105 provide ease of installment of the cone nut 100, allowing the installer to rotate the channel nut 104 the approximately 90° that is necessary so that the channel nut 104 is in a transverse position in relation to the structural channel 101. Also shown in FIG. 9 is an internally screw-threaded aperture 109 for screw attachment of a bolt or similar fastening device (not shown) for the attachment of various loads which may be supported by the structural channel 101 which the cone nut 100 is installed on.

Figure 7:
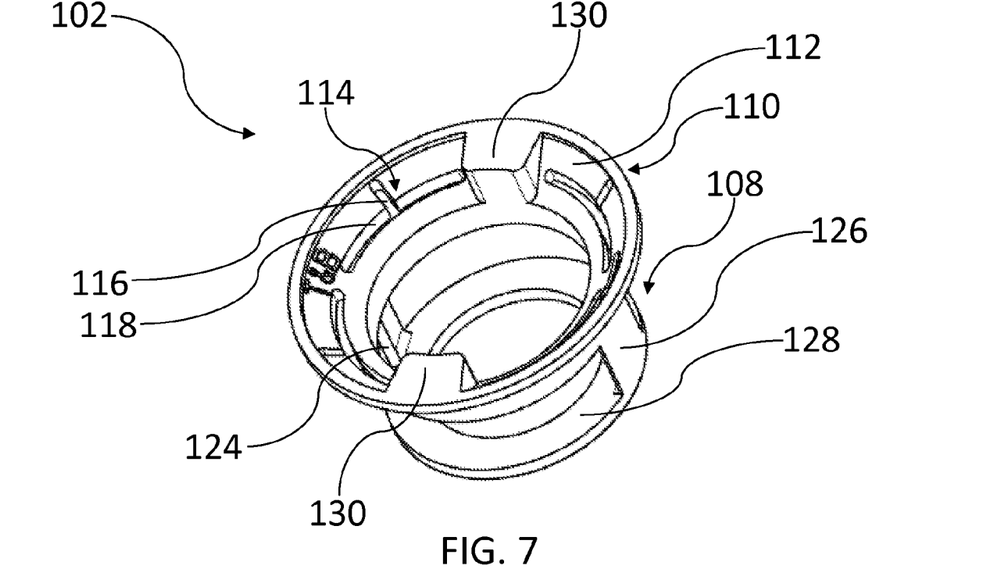
FIG. 7 is a top perspective view of the cone of a cone nut of the present invention.

Shown in detail in FIG. 7 are the various parts which comprise the flexible cone 102 of the cone nut 100. The various components of the cone attachment portion 108 are shown which house the channel nut 104 when the cone 102 receives the channel nut 104, as described above. Also shown is a conical portion 110 of the cone 102, which gives the cone 102 its shape. The conical portion 110 is comprised of a conical wall 112, in which are contained T-shaped slots 114. The T-shaped slots are comprised of a vertical slot portion 116 and a transverse slot portion 118. The T-shaped slots 114 provide enhanced flexibility to the cone 102 so as to facilitate attachment of the cone nut 100 to the structural channel 101. This enhanced flexibility is provided as the slots 114 can compress under manual pressure caused by attachment of the cone nut 100 to the channel 101. The enhanced flexibility provided by the slots 114 allows the cone nut 100 to more easily be attached to the channel 101, yet provides the desired degree of resilient compression to hold the cone nut 100 against the inwardly turned flanges 103 of the channel 101, as shown in FIG. 11. Although there are several T-shaped slots 114 shown in FIG. 7, it is understood that there may be more or less than what is shown in FIG. 7 in order to provide the cone 102 with the resilient flexibility that is needed. Lastly, also shown in FIG. 7 are finger grips 130 which comprise part of the cone 102 and allow for the installer of the cone nut 100 to easily rotate the cone nut 100 (and in turn, the channel nut 104) the approximately 90° that is necessary, as described in the paragraph above.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A cone nut for a structural channel comprising:
a channel nut portion;
a resiliently flexible cone having an attachment portion for attachment to the channel nut portion; and
wherein the attachment portion of the cone surrounds the channel nut, at least partially, on four sides of the channel nut and houses and retains the channel nut by a friction fit locking mechanism between the cone and the channel nut;
wherein the channel nut portion has two opposite side surfaces each having at least one groove and wherein the attachment portion of the cone comprises at least one rib that becomes seated within the at least one groove of the side surfaces of the channel nut when the attachment portion of the cone is attached to the channel nut to provide the friction fit locking mechanism.

2. The cone nut of claim 1, wherein the conical portion is defined by a conical wall having at least one slot there through to permit resilient flexibility of the conical wall and wherein the at least one slot is generally T-shaped having a vertical slot portion extending along the conical wall and a transverse slot portion in intersection therewith.

3. The cone nut of claim 1, wherein the attachment portion of the flexible cone protrudes downward and opposite from the conical wall and is sized such that the channel nut securely fits within the attachment portion and such that the attachment portion encases the channel nut on four sides of the channel nut.

4. The cone nut of claim 1, wherein the conical portion includes finger grips extending inwardly from the conical wall so as to permit manual rotation of the channel nut within the structural channel when the cone has received the channel nut.

5. The cone nut of claim 1, wherein the flexible cone is formed of nylon.

6. The cone nut of claim 1, wherein the channel nut portion is formed of metal.

7. A cone nut for a structural channel comprising:
a channel nut portion having opposed planar surfaces and opposite side surfaces; and
a resiliently flexible cone having an attachment portion for attachment to the channel nut portion by receiving the channel nut portion through the attachment portion of the cone such that the cone houses the channel nut and such that a conical portion of the cone extends conically outward from one of the planar surfaces of the channel nut portion;
wherein the attachment portion of the flexible cone surrounds the channel nut continuously on the opposed planar surfaces and the opposite side surfaces of the channel nut;
wherein the two opposite side surfaces comprise at least one groove and wherein the attachment portion of the cone comprises at least one rib that becomes seated within the at least one groove of the side surfaces of the channel nut when the attachment portion of the cone receives and houses the channel nut to provide the friction fit locking mechanism.

8. The cone nut of claim 7, wherein the conical portion includes finger grips extending inwardly from a conical wall which defines the conical portion so as to permit manual rotation of the channel nut within the structural channel when the cone has received the channel nut.

9. The cone nut of claim 7, wherein the flexible cone is formed of nylon.

10. The cone nut of claim 7, wherein the channel nut portion is formed of metal.

11. The cone nut of claim 7, wherein the conical portion is defined by a conical wall having at least one slot there through to permit resilient flexibility of the conical wall and wherein the slot is generally T-shaped having a vertical slot portion extending along the conical wall and a transverse slot portion in intersection therewith.

12. The cone nut of claim 11, wherein the conical wall includes a plurality of the slots rotationally spaced thereabout.

13. A cone nut for a structural channel comprising:
a channel nut portion having a planar surface;
a resiliently flexible cone having an attachment portion for attachment to the channel nut portion by receiving the channel nut portion through the attachment portion of the cone such that the cone houses the channel nut and such that a conical portion of the cone extends conically outward from the planar surface of the channel nut portion, the conical portion being defined by a conical wall having at least one slot there through to permit resilient flexibility of the conical wall;
wherein the slot is generally T-shaped having a vertical slot portion extending along said conical wall and a transverse slot portion in intersection therewith;
wherein the attachment portion of the flexible cone protrudes downward and opposite from the conical portion and is sized such that the channel nut securely fits within the attachment portion and such that the attachment portion surrounds the channel nut, at least partially, on four sides of the channel nut; and
wherein the channel nut portion has two opposite side surfaces which are perpendicular to and protrude downward from the planar surface and wherein the two opposite side surfaces comprise at least one groove and wherein the attachment portion of the cone comprises at least one rib that becomes seated within the at least one groove of the side surfaces of the channel nut when the attachment portion of the cone receives and houses the channel nut.

14. The cone nut of claim 13, wherein the conical wall includes a plurality of the slots rotationally spaced thereabout.

15. The cone nut of claim 13, wherein the conical portion includes finger grips extending inwardly from the conical wall so as to permit manual rotation of the channel nut within the structural channel when the cone has received the channel nut.

16. The cone nut of claim 13, wherein the flexible cone is formed of nylon.

17. The cone nut of claim 13, wherein the channel nut portion is formed of metal.

* * * * *